Aug. 18, 1953 — F. P. MASELLIS — 2,649,359
DEVICE FOR DOSING UREA IN BLOOD AND IN URINE
Filed May 7, 1951

Inventor
F. P. Masellis

Patented Aug. 18, 1953

2,649,359

UNITED STATES PATENT OFFICE 2,649,359

DEVICE FOR DOSING UREA IN BLOOD AND IN URINE

Francesco Paolo Masellis, Rome, Italy, assignor to "Aesculapius" S. r. l., Milan, Italy, a firm Application May 7, 1951, Serial No. 224,970
In Italy September 30, 1950

4 Claims. (Cl. 23—254)

The present invention relates to a device for determining azotaemia or for dosing urinary urea, by means of a reaction with sodium hypobromite. The device accurately measures the evolved gases volumetrically.

It is an object of the invention to provide a device easy to be employed, which does not require the use of tables or complicated calculations and is useful to furnish the data requested by means of a mere volumetric measurement and the knowledge of a numeric coefficient, which is a function of the very device, yielding an approximation sufficient for clinical needs.

It is known now to be complicated to use the various apparatuses employed at present for determining the values in question, and it is also known that said apparatuses are in general useful either for determining azotaemia or for determining the rate of urinary urea.

A further object of the invention is to provide a device which alone is adapted for measuring either of said values as needed.

According to this invention a device is provided with a horizontal reaction chamber of substantially cylindrical shape at the ends of which are branched off two ascending pipes.

One of said pipes has a cock that can be operated from outside, while the other pipe, which is parallel to the first one in its initial section, is united to the first with a substantially horizontal cross-piece, from which originates a pipe with two diameters, open at its free end, graduated, adapted to serve as a barometric column, viz. to give under conditions of constant pressure, the measure of an expanding gas volume, by the modification of the height of a liquid column contained in said pipe by the pressure of gases evolved in the apparatus.

The pipe provided with a cock, is further closed at its free end with a ground glass stopper, of standardized dimensions, provided with a hole or channel for controlled venting of the reaction chamber to the atmosphere through the bent pipe, if the barometric column is full of liquid, and the intercepting cock of the first pipe is closed.

One preferred form of embodiment of the invention is illustrated in the accompanying drawing, wherein.

Figure 1:
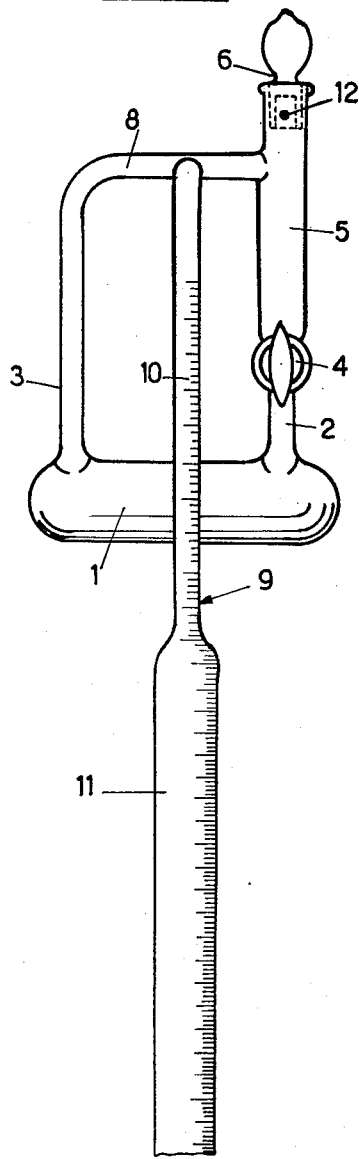
Fig. 1 represents a front elevation of the device.
Figure 2:
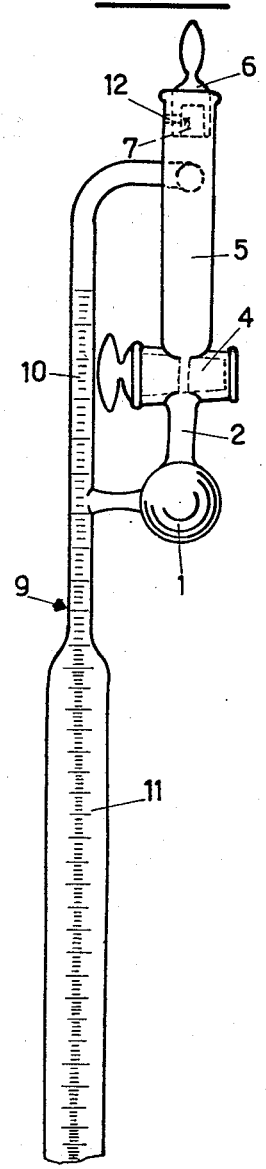
Fig. 2 represents a side elevation of the same device.

With reference to the drawing, the device comprises the reaction chamber 1 in horizontal position, at the ends of which are provided the two vertical pipes 2 and 3.

The pipe 2 presents in the proximity of the reaction chamber 1, the cock 4, above which the said pipe has the shape of a cylindrical test tube 5, of larger diameter, joined to said cock 4.

The upper part of the test tube 5 is closed by an inside hollow stopper 6 of standardized dimensions and provided with a lateral hole 7 used to vent the interior of the tube 5 with the outside, through a corresponding hole 12 in the side wall of the tube 5.

In the proximity of the upper end of the tube 5, is connected thereto the horizontal cross-piece 8, which constitutes an extension of the pipe 3.

About at the middle of the cross-piece 8 there is branched off the pipe 9, which constitutes a barometric column and which comprises an upper part 10 of smaller diameter graduated with a zero graduation at a certain distance from the branching off point of the cross-piece 8, and a lower part 11 of larger diameter, which too is graduated.

Each graduation of the upper section 10 corresponds to 1/50 cc. and each graduation of the lower section 11 corresponds to 1/10 cc.

It is important to note that the dimensions of the tube 5 are such as to permit to introduce into said tube the pipette containing the liquid, with which the requested determination is to be carried out, as far as to insert its end into the duct of the cock 4. In this way, traces of the liquid to be examined are prevented from depositing on the inner walls of the tube 5 and from reacting thus too early with the sodium hypobromite to be employed for the reaction.

The apparatus according to the invention is employed as follows:

Remove the stopper 6 and by means of a pipette, after having opened the cock 4, introduce into the chamber 1 for instance 2 cc. of haemel filtrate; then add 1 cc. of 10% sodium hydroxide solution. Close the cock 4 and introduce into the tube 5, 4 to 5 cc. of sodium hypobromite.

Then place the stopper 6 in such a manner that its duct 7 puts the chamber 1 in communication with the outside through the pipes 3 and 8, and immerse the whole into a vessel of sufficient height full of water, until said water on rising in the barometric column reaches the zero graduation.

Rotate the stopper 6 so as to break the communication between the outside and the reaction chamber, lift if needed the device from the vessel, taking care that the foot of the barometric column always remains under the water level, open the cock 4 so as to make sodium hypobromite flow into the reaction chamber and shake in such a manner as to have the reaction take place to completion inside the chamber 1, which involves development of gas.

Then take the device to such a level that the liquid level in the barometric column corresponds to the liquid level of the vessel with which the operation is carried out, and then read direct on the barometric column the volume of gas developed, which volume multiplied by a fixed coefficient, being a function of the device with which the operation is carried out, and of the quantities of reagent playing, furnishes the percentage of urea to be ascertained.

The present invention has been illustrated and described in a preferred form of embodiment, but it is understood that constructive variants may be provided in practice without departing from the scope of the present patent.

Having now particularly described and ascertained the nature of my said invention and in what manner the same is to be performed, I declare that what I claim is:

1. Volumetric gas analytical device comprising a horizontally mounted reaction chamber, a vertically mounted fluid supply chamber communicating with one end of said reaction chamber, said fluid supply chamber having a stop cock mounted at its lower end for control of fluid passage to said reaction chamber, a graduated volumetric burette mounted invertedly vertically upon said apparatus with an open end extending downwardly therefrom and the opposite end communicating with the upper horizontal portion of said reaction chamber, and additional valve means for venting said reaction chamber and burette to the atmosphere.

2. Apparatus as defined in claim 1, wherein the burette comprises an elongated cylindrical tube in which the lowermost depending portion is of relatively wide diameter with large volumetric calibrations thereon and the upper portion of said burette communicating with the reaction chamber and with the large diameter depending portion of said burette is of relatively small diameter with fine volumetric calibrations thereon.

3. Apparatus as defined in claim 1, wherein said vertically mounted supply chamber is of sufficient large diameter to insert a pipette directly into the valve opening mounted in the bottom thereof.

4. Apparatus as defined in claim 1, wherein said vertically mounted fluid supply chamber has a rotatable stopper fitted gas-tight therein, said stopper and said upper end of said fluid supply chamber having complementary bores whereby to vent said chamber to the atmosphere when said bores are aligned, and a separate gas venting tube, one end of which communicates with said fluid supply chamber and the other with said reaction chamber.

FRANCESCO PAOLO MASELLIS.

References Cited in the file of this patent
UNITED STATES PATENTS

| Number | Name | Date |
|---|---|---|
| 1,046,259 | Bunzel | Dec. 3, 1912 |
| 1,074,795 | Johnson | Oct. 7, 1913 |
| 2,089,796 | Hopf et al. | Aug. 10, 1937 |

OTHER REFERENCES

Catalogue, Schaar and Co., No. 50, May 9, 1950, Figs. B66880 and G2030, pages 71 and 324.